United States Patent [19]

Das et al.

[11] Patent Number: 4,801,653

[45] Date of Patent: Jan. 31, 1989

[54] COATING COMPOSITIONS PREPARED FROM HYDROXYL FUNCTIONAL GRAFT COPOLYMERS

[75] Inventors: Suryya K. Das, Pittsburgh; Rostyslaw Dowbenko, Gibsonia; Samuel Porter, Natrona Heights, all of Pa.

[73] Assignee: PPG Industries, Inc., Pittsburgh, Pa.

[21] Appl. No.: 135,903

[22] Filed: Dec. 21, 1987

Related U.S. Application Data

[62] Division of Ser. No. 887,501, Jul. 21, 1986, Pat. No. 4,748,211.

[51] Int. Cl.$^4$ .................... C08G 59/16; C08F 269/00; C08L 33/02
[52] U.S. Cl. .................................. 525/286; 525/528; 525/530; 525/531
[58] Field of Search .................. 525/286, 530, 531, 528

[56] References Cited

U.S. PATENT DOCUMENTS

| | | | |
|---|---|---|---|
| 3,028,359 | 4/1962 | Gaylord | 260/45.2 |
| 3,810,859 | 5/1974 | Mikofalvy | 525/286 |
| 3,872,047 | 3/1975 | Jandourek | 525/286 |
| 3,929,935 | 12/1975 | Kinstle | 525/286 |
| 3,953,408 | 4/1976 | Hosoi et al. | 525/286 |
| 4,304,701 | 12/1981 | Das et al. | 525/286 |
| 4,308,185 | 12/1981 | Evans et al. | 428/418 |
| 4,399,241 | 8/1983 | Ting et al. | 523/400 |
| 4,415,681 | 11/1983 | Horvath | 523/334 |
| 4,482,673 | 11/1984 | Brown et al. | 525/119 |
| 4,522,962 | 6/1985 | Abbey et al. | 525/529 |
| 4,532,309 | 7/1985 | Lindert | 525/529 |

*Primary Examiner*—Lewis T. Jacobs
*Assistant Examiner*—Robert E. L. Sellers, II
*Attorney, Agent, or Firm*—Linda Pingitore

[57] ABSTRACT

A coating composition which exhibits excellent sag resistance without the necessity for externally added rheology control agent is prepared from a curing agent and an ungelled hydroxyl functional graft copolymer. The graft copolymer is prepared by the vinyl addition polymerization, in an inert organic solvent, of a vinyl monomer component containing at least a portion of a carboxyl functional vinyl monomer in the presence of a glycidyl ester containing acrylic polymer. The grafting occurs by the condensation reaction between the carboxyl groups of the vinyl monomer component and the epoxy groups of the glycidyl ester containing acrylic polymer.

10 Claims, No Drawings

COATING COMPOSITIONS PREPARED FROM HYDROXYL FUNCTIONAL GRAFT COPOLYMERS

This is a division of application Ser. No. 887,501, filed July 21, 1986, now U.S. Pat. No. 4,748,211.

BACKGROUND OF THE INVENTION

In recent years there has been a growing trend towards the development of coating compositions having a reduced volatile organic content. One approach to achieving this goal has been to move toward high solids compositions which are formulated from low molecular weight polymers. High solids compositions such as these, however, generally require a rheology control agent such as, for example, microgel in order to minimize sag and provide metallic pigment pattern control where such pigments are utilized. The presence of rheology control agents can be disadvantageous since quite often they detract from the clarity of clear coating compositions by imparting a hazy or yellowish cast to the film. Moreover, the gloss is often reduced since the rheology control agents lend a flat appearance to the cured film.

There is a need, therefore, for a way to prepare high solids coating compositions which can be formulated into "water-like" clear coating compositions which exhibit good gloss, sag resistance, and metallic pigment pattern control without the necessity of externally added rheology control agents.

SUMMARY OF THE INVENTION

In accordance with the present invention, there is provided a coating composition comprising an ungelled, hydroxyl functional graft copolymer prepared by the vinyl addition polymerization in an inert organic solvent of a vinyl monomer component comprising at least a portion of a carboxyl functional vinyl monomer in the presence of a glycidyl ester containing acrylic polymer, the grafting occurring by the condensation reaction between the carboxyl groups of the vinyl monomer component and the epoxy groups of the glycidyl ester containing acrylic polymer; and a curing agent adapted to cure the hydroxyl functional graft copolymer.

DETAILED DESCRIPTION OF THE INVENTION

The ungelled, hydroxyl functional graft copolymer of the present invention is prepared by the free radical initiated vinyl addition polymerization of a vinyl monomer component. The polymerization is conducted in the presence of a polymer containing epoxy groups. Either the polymer containing epoxy groups or the vinyl monomer component can contain hydroxyl functionality, so long as at least one of them does. Preferably both the vinyl monomer component and the polymer containing epoxy groups are hydroxyl functional.

It should be understood that by the term "ungelled" is meant that the graft copolymer is soluble in a suitable solvent with essentially no insoluble fraction. Examples of suitable solvents include tetrahydrofuran, acetone, xylene and other similar common organic solvents. A gelled material is a three dimensional crosslinked matrix which cannot be dissolved in common organic solvents and whose molecular weight by gel permeation chromatography cannot be determined. In addition, it is believed that the presence of gelled material interferes with the rheology of a polymeric product resulting in poor atomization during spray application and poor flow in coating applications.

Moreover, by "hydroxyl functional" is meant predominantly that hydroxyl functionality which comes from the hydroxyl functional vinyl monomers of the vinyl monomer component. There is also some minor proportion which is generated from the reaction of epoxy groups with carboxyl groups.

The vinyl monomer component comprises at least a portion of a carboxyl functional vinyl monomer. Moreover, it is preferred that the vinyl monomer component is free of epoxy group containing vinyl monomers. Examples of suitable carboxyl functional vinyl monomers include acrylic acid, methacrylic acid and monoesters of unsaturated dicarboxylic acids such as maleic acid, fumaric acid, and itaconic acid, for example, mono(hydroxyethyl) and mono(hydroxypropyl) esters of maleic acid. The balance of the vinyl monomer component can include a variety of other vinyl monomers which contain polymerizable vinyl unsaturation. For example, hydroxyl functional vinyl monomers such as 2-hydroxyethyl acrylate, 2-hydroxyethyl methacrylate, 2-hydroxypropyl acrylate, 2-hydroxypropyl methacrylate, and 2-hydroxybutyl methacrylate. Also useful are acrylamide; an N-methylol- acrylamide such as the reaction product of acrylamide with formaldehyde; N-butoxymethyl acrylamide; tertiarybutylaminoethyl methacrylate; sulfoethyl methacrylate; and alkyl acrylates and methacrylates which contain from 1 to 18 carbon atoms, preferably 1 to 6 carbon atoms in the alkyl portion such as methyl (meth)acrylate, ethyl (meth)acrylate, propyl (meth)acrylate, butyl (meth)acrylate, pentyl (meth)acrylate, hexyl(meth)acrylate, heptyl (meth)acrylate, 2-ethylhexyl methacrylate, lauryl (meth)acrylate, stearyl (meth)acrylate, isodecyl (meth)acrylate and isobornyl (meth)acrylate. Also useful are styrene, para-methyl styrene, alpha-methyl styrene, acrylonitrile, methacrylonitrile and vinyl ethers such as vinyl acetate or vinyl versatate. Mixtures of the aforesaid monomers can also be utilized if desired.

In one preferred embodiment of the present invention, the vinyl monomer component contains hydroxyl functionality, therefore, it will contain some proportion of hydroxyl functional vinyl monomer or mixture of monomers, examples of which have been detailed above.

The amount of carboxyl functional vinyl monomer in the vinyl monomer component generally ranges from about 1.5 percent by weight to about 15 percent by weight, the percentages based on the total weight of the vinyl monomer component. Usually, the amount of carboxyl functional vinyl monomer ranges from about 1.5 percent by weight to about 10 percent by weight, preferably from about 1.5 percent by weight to about 4 percent by weight and more preferably from about 2.5 percent by weight to about 3 percent by weight.

The polymer containing epoxy groups is preferably an epoxy functional acrylate which is prepared by the vinyl addition polymerization of a vinyl monomer component containing at least a portion of an epoxy functional vinyl monomer such as glycidyl acrylate, glycidyl methacrylate, or allyl glycidyl ether. The balance of the vinyl monomers can be selected from those detailed above. In one preferred embodiment of the present invention the polymer containing epoxy groups also contains hydroxyl functionality; therefore, it will contain some proportion of moieties derived from hydroxyl functional vinyl monomers.

The amount of epoxy functional vinyl monomer present in the polymer containing epoxy groups generally ranges from about 3 percent by weight to about 30 percent by weight, the percentages being based on the total weight of the monomers utilized in the preparation of the polymer containing epoxy groups. Usually the amount of epoxy functional vinyl monomer ranges from about 3 percent by weight to about 20 percent by weight, preferably from about 3 percent by weight to about 10 percent by weight and more preferably from about 4 percent by weight to about 8 percent by weight.

The polymer containing epoxy groups generally has a number average molecular weight determined by gel permeation chromatography using a polystyrene standard ranging from about 1000 to about 50,000 preferably 1000 to 5000 and more preferably 2000 to 3000.

The grafting reaction for the preparation of the claimed hydroxyl functional graft copolymer occurs by the condensation reaction between the carboxyl groups of the vinyl monomer component and the epoxy groups in the backbone polymer containing epoxy groups. The ratio of epoxy groups of the backbone polymer to the carboxyl groups in the vinyl monomer component is generally within the range from 1:0.5 to 0.5:1.

The vinyl addition polymerization reaction to prepare the graft copolymer is usually conducted at a temperature within the range of about 125° C. to about 200° C., preferably 140° C. to 160° C. There is generally present a free radical initiator which is selected from a wide variety of materials. Suitable types of materials include peroxides, hydroperoxides and azo initiators. Examples of these types of initiators include di-tertiarybutyl peroxide, di-cumylperoxide; amyl peroxyacetate; cumenehydroperoxide; 2,5-dimethyl-2,5-bis(tertiarybutylperoxy) hexane; hexyne-3-tertiarybutyl cumylperoxide; tertiaryamyl peroxide; 2,5-dihydroperoxy 2,5-dimethyl hexane, di(n-propyl) peroxydicarbonate, and 2,2'-azobis(2,4-dimethyl-4-methoxyvaleronitrile).

The amount of initiator can very widely although usually it is present in an amount ranging from about 3 percent to about 8 percent, the percentage based on the total weight of the vinyl monomer component. Generally, there is also present during the vinyl addition polymerization a solvent which assists in maintaining the preferred reaction temperature. Examples of these solvents include methyl amyl ketone, aromatic petroleum distillates, 2-ethylhexyl acetate, and high boiling ester solvents such as those commercially available from Exxon Chemical Corporation under the trademark designations EXTATE 600 and EXTATE 700.

The graft copolymers of the present invention are useful as film-forming vehicles in the preparation of high solids coating compositions such as, for example, clear coating compositions useful in automotive applications. The resultant coating compositions have low volatile organic content, generally to a maximum of 3.50 pounds/gallon, preferably to a maximum of 3.1 pounds/gallon, and the cured films exhibit good physical properties. The claimed graft copolymers usually have a peak molecular weight as determined by GPC using a polystyrene standard ranging from abou 4,000 to about 20,000, preferably from about 6,000 to about 12,000. One very important advantage of the claimed graft copolymers is that coating compositions formulated from them exhibit excellent gloss, sag resistance and metallic pigment pattern control without the necessity of adding external rheology control agents. In addition, particularly in the clear coating compositions, the compositions exhibit exceptional clarity. As has been discussed previously, clear coating compositions containing externally added rheology control agents often have a hazy appearance or yellowist cast. Of course, it should be understood that, if desired, externally added rheology control agents also can be added.

In preparing the coating compositions of the present invention the graft copolymer is usually combined with a curing agent which is capable of reacting with the hydroxyl functionality which is present on the graft copolymer.

Examples of suitable curing agents are aminoplast, phenoplast and polyisocyanate curing agents, including blocked isocyanates. Typically, a cure promoting catalyst is utilized in conjunction with an aminoplast curing agent, for example, acid catalysts and blocked acid catalysts such as para-toluenesulfonic acid, di-nonylnaphthalene disulfonic acid, and the amine blocked forms of both of these.

A solvent is also typically utilized, in minimal amounts, to facilitate formulation and application of the coating compositions of the present invention. An organic solvent is utilized which is compatible with the components of the compositions. The amounts of graft copolymer, curing agent, and catalyst will, of course, vary widely depending upon many factors, among them the specific components of the composition and the intended use of the composition. The curing agents mentioned above are descibed more fully below.

Aminoplast condensates are obtained from the reaction of formaldehyde with an amine or an amide. The most common amines or amides are melamine, urea or benzoguanamine and are preferred. However, condensates with other amines and amides can be employed, for example, aldehyde condensates or triazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3-5-triazine and the like.

While the aldehydes employed is most often formaldehyde, other aldehydes such as acetaldehyde, crotonaldehyde, benzaldehyde and furfural may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis(cyclohexylisocyanate), isophorone disocyanate and NCO-prepolymers such as the reaction products of monomeric polyisocyanate such as those mentioned above with polyester or polyether polyols. Particularly useful isocyanates are isophorone diisocyanate and the biuret from 1,6-hexamethylene diisocyanate commercially available from Bayer as DESMODUR N. The polyisocyanate may optionally be blocked. Examples of suitable blocking agents are those materials which would unblock at elevated temperatures such as lower aliphatic alcohols such as methanol, oximes such as methyl ethyl ketone oxime, and lactams such as epsilon-caprolactam. Blocked isocyanates can be used to form stable one-package systems. Polyfunctional isocyanates with free isocyanate groups can be used to form two-package room temperature curable systems. In these systems, the product and isocyanate curing agent are mixed just prior to their application.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as monobutenyl phenols containing a butenyl group in ortho, meta or para position, and where the double bond occurs in various positions in the hydrocarbon chain. A common phenolic resin is phenol formaldehyde.

In addition, the compositions of the present invention may contain a variety of other optional ingredients, including pigments, fillers, plasticizers, antoxidants, surfactants and flow control agents.

The compositions can be applied by any conventional method including brushing, dipping, flow coating, etc., but typically they are applied by spraying. Also, the compositions can be applied over a variety of substrates including wood, metals, and glass.

The following examples are illustrative of the invention and are not intended to limit it to their details.

EXAMPLE I

This example illustrates the preparation of a liquid, ungelled hydroxyl functional graft copolymer according to the present invention.

Part A
Preparation of Acrylic Polymer Containing Epoxy Groups

| Charge | Ingredients | Parts by Weight (grams) |
|---|---|---|
| I | AROMATIC-100[1] | 366.80 |
| II | styrene | 205.80 |
|  | butyl acrylate | 195.30 |
|  | butyl methacrylate | 181.30 |
|  | hydroxypropyl acrylate | 68.60 |
|  | glycidyl methacrylate | 26.04 |
| III | AROMATIC-100 | 7.50 |
|  | amyl peroxyacetate[2] | 67.60 |
| IV | AROMATIC-100 | 35.00 |

-continued

Part A
Preparation of Acrylic Polymer Containing Epoxy Groups

| Charge | Ingredients | Parts by Weight (grams) |
|---|---|---|
| V | AROMATIC-100 | 21.00 |

[1]This solvent was an aromatic petroleum distillate commercially available from Exxon.
[2]Available from Pennwalt Corp. as a 6 percent solution in ISOPAR K. (ISOPAR K is a trademark of Exxon.)

A suitably equipped reactor vessel was charged with (I) and heated to reflux. Charges (II) and (III) were added together continuously over a three hour period. When the addition was completed, Charges (IV) and (V) were added and the reaction mixture was held at reflux temperatures for four hours. Finally, the reaction mixture was allowed to cool to room temperature. The resultant epoxy functional acrylic polymer had a peak molecular weight of 4499 as determined by gel permeation chromatography (GPC) using a polystyrene standard; a total solids content of 60.5 percent determined at 110° C. for one hour; a Gardner viscosity of D and an acid value of 1.2.

Part B
Preparation of Ungelled, Hydroxyl Functional Graft Copolymer

| Charge | Ingredients | Parts by Weight (grams) |
|---|---|---|
| I | Epoxy-functional acrylic polymer of Part A | 1174.9 |
|  | AROMATIC-100 | 344.4 |
| II | methyl methacrylate | 10.2 |
|  | styrene | 201.6 |
|  | butyl acrylate | 200.9 |
|  | butyl methacrylate | 190.4 |
|  | hydroxypropyl acrylate | 776.3 |
|  | acrylic acid | 31.8 |
| III | amyl peroxyacetate | 141.1 |
|  | AROMATIC-100 | 13.4 |
| IV | AROMATIC-100 | 35.0 |
| V | AROMATIC-100 | 21.0 |
| VI | butyl acetate | 266.5 |

A suitably equipped reactor vessel was charged with (I) and heated to reflux. Charges (II) and (III) were then added together continuously over a period of three hours. During the course of the addition 15.3 grams of solvent was removed by azeotropic distillation in order to maintain the temperature above 150° C. After the addition was completed Charges (IV) and (V) were added and the reaction mixture was held at reflux temperature for a four hour period. Finally, the reaction mixture was allowed to cool to room temperature and Charge (VI) was added to reduce the viscosity. The resultant product had a peak molecular weight of 8929 as determined by GPC using a polystyrene standard; a Gardner viscosity of X-; a total solids content of 65 percent at 110° C. for one hour and an acid value of 1 to 2.

EXAMPLE II

This example is similar to Example II, above, with the exception that the initiator was ditertiarybutyl peroxide.

Part A
Preparation of Acrylic Polymer Containing Epoxy Groups

| Charge | Ingredients | Parts by Weight (grams) |
|---|---|---|
| I | AROMATIC-100¹ | 2934.4 |
| II | styrene | 1646.4 |
|   | butyl acrylate | 1563.2 |
|   | butyl methacrylate | 1450.4 |
|   | hydroxypropyl acrylate | 548.8 |
|   | glycidyl methacrylate | 273.6 |
| III | AROMATIC-100 | 268.8 |
|   | ditertiarybutyl peroxide | 273.6 |
| IV | AROMATIC-100 | 280.0 |
| V | AROMATIC-100 | 168.0 |

A suitably equipped reactor vessel was charged with (I) and heated to reflux. Charge (II) was then added at a rate of 31.7 stroke while Charge (III) was added at a rate of 210 grams over 3 hours. When the addition was completed, Charges (IV) and (V) were added and the reaction mixture held at reflux for four hours. The reaction mixture was then allowed to cool to room temperature. The resultant epoxy functional acrylic polymer had a peak molecular weight of 5303 as determined by GPC using a polystyrene standard; a total solids content of 63.1 percent at 110° C. for one hour; a Gardner viscosity of Q and an acid value of zero.

Part B
Preparation of Ungelled, Hydroxyl Functional Graft Copolymer

| Charge | Ingredients | Parts by Weight (grams) |
|---|---|---|
| I | Epoxy-functional acrylic polymer of Part A | 1175.8 |
|   | AROMATIC-100 | 344.4 |
| II | methyl methacrylate | 10.2 |
|   | styrene | 201.6 |
|   | butyl acrylate | 200.9 |
|   | butyl methacrylate | 190.4 |
|   | hydroxy propyl acrylate | 776.3 |
|   | acrylic acid | 31.8 |
| III | AROMATIC-100 | 70.0 |
|   | ditertiarybutyl peroxide | 70.7 |
| IV | AROMATIC-100 | 35.0 |
| V | AROMATIC-100 | 21.0 |
| VI | butyl acetate | 258.0 |

A suitably equipped reactor vessel was charged with (I) and heated to reflux. Charges (II) and (III) were then added together continuously over a three hour period. When the addition was completed, Charges (IV) and (V) were added and the reaction mixture was held at reflux for four hours. Finally the reaction mixture was allowed to cool to room temperature and reduced in viscosity with the addition of Charge (VI). The resultant product had a total solids content of 63.9 percent at 110° C. for one hour, a Gardner viscosity of Z-7; and an acid value of 8.4.

EXAMPLE III

This example illustrates the preparation and evaluation of a clear coating composition utilizing the hydroxyl functional graft copolymer of Example II, above, as a film former. This coating composition was compared to a control coating composition formulated without the graft copolymer.

The control coating composition was identical to the coating composition set out below with the exceptions that instead of the graft copolymer of Example II, the film-former was the acrylic polymer of Part A of Example II. Also utilized was an externally added rheology control agent in the form of microgel as described in U.S. Pat. No. 4,147,688, Example II. The amount of microgel which was added was 4.5 grams (2 percent based on 100 grams of resin solids.) In addition, xylene was utilized instead of butyl acetate.

| Ingredients | Parts by Weight (grams) |
|---|---|
| hydroxy functional graft copolymer of Example II utilizing 5 percent glycidyl methacrylate monomer | 70.50 |
| TINUVIN 328³ | 3.00 |
| butyl acetate | 30.00 |
| CYMEL 1130⁴ | 50.00 |
| blocked acid catalyst⁵ | 2.50 |
| polybutylacrylate⁶ | 0.75 |
| methanol | 6.00 |
| butyl acetate | 25.00 |

³This benzotriazole ultraviolet light stabilizer is commercially available from Ciba-Giegy Corp.
⁵This blocked acid catalyst was a diisopropanolamine blocked dinonylnapthalene disulfonic acid.
⁶This was a flow control agent and anticratering additive.

The coating composition having a resin solids content of 53.2 percent was prepared by combining the ingredients together with mild agitation. It was applied to a steel panel coated with UNI-PRIME ® coating composition (commercially available from PPG Industries, Inc., as ED 3150). This primed panel was base coated at a dry film thickness of 0.57 mil with a coating composition commercially available from PPG Industries, Inc., as UBC 9021. The basecoat was flashed for two minutes and then the clear coating composition detailed above was applied at a dry film thickness of 1.5 mil and then baked for 25 minutes at 285° F. (141° C.). The control clear coating composition was applied to a control panel and evaluated in identical fashion. The panels were evaluated for appearance (clarity) of the cured film, 20° gloss (horizontal/vertical) as well as distinctness of image (DOI) and the amount of sag.

The appearance of the film (clarity) was determined by visual inspection.

Gloss was measured with a glossmeter at 20°.

Sag was determined after the panels were baked. The panels were positioned horizontally in a rack at a 45° angle and the amount of sag from the edge of the panel was measured in centimeters.

DOI was measured with a "C-box" which is commercially available from I²R Company. To measure DOI a series of C's of different sizes are projected onto the surface of the film being evaluated. Each size of C is given a numerical rating between 0 and 100 with 0 indicating that the film has no reflective clarity to the opening part of the C and 100 indicating that the film has maximum reflective clarity to the opening part of the C. The values in between indicate varying degrees of clarity.

The results are set out below.

| Coating Composition | Resin Solids (percent) | 20° Gloss Horizontal/Vertical | DOI Horizontal/Vertical | SAG (CM) | Appearance of Film |
|---|---|---|---|---|---|
| Graft copolymer | 53.2 | 96/98.2 | 45/40 | 0 | water-like clear |
| Control | 56.2 | 99/99 | 60/50 | 0 | yellowish cast |

The above results illustrate that the coating compositions of the present invention formulated with the claimed graft copolymers exhibit excellent water-like film clarity, good gloss, DOI and sag resistance, comparable to the control, without the necessity of externally added rheology control agents. The control composition utilizing an externally added rheology control agent had poor film clarity since the film had a yellowish cast, although the other properties were comparable to the composition utilizing the graft copolymer.

What is claimed is:

1. A coating composition comprising an ungelled, hydroxyl functional graft copolymer prepared by the vinyl addition polymerization, in an inert organic solvent, of a vinyl monomer component comprising at least a portion of a carboxyl functional vinyl monomer in the presence of a glycidyl ester containing acrylic polymer, the grafting occurring by the condensation reaction between the carboxyl groups of the vinyl monomer component and the epoxy groups of the glycidyl ester containing acrylic polymer; and a curing agent adapted to cure the hydroxyl functional graft copolymer.

2. The coating composition of claim 1 wherein the vinyl monomer component contains hydroxyl functionality.

3. The coating composition of claim 1 wherein glycidyl ester containing acrylic polymer contains hydroxyl functionality.

4. The coating composition of claim 1 wherein both the glycidyl ester containing acrylic polymer and the vinyl monomer component contain hydroxyl functionality.

5. The coating composition of claim 1 wherein the curing agent is selected from aminoplasts, phenoplasts and polyisocyanates.

6. The coating composition of claim 1 wherein the composition is a high solids coating composition.

7. The coating composition of claim 1 wherein it is essentially free of externally added rheology control agents.

8. The coating composition of claim 4 wherein the vinyl monomer component comprises a hydroxyl functional vinyl monomer selected from 2-hydroxyethyl acrylate, 2-hydroxyethylmethacrylate, hydroxypropyl acrylate and hydroxypropyl methacrylate.

9. The coating composition of claim 1 wherein the carboxyl functional vinyl monomer of the vinyl monomer component is selected from acrylic acid, methacrylic acid, a monoester of maleic acid and a monoester of fumaric acid.

10. The coating composition of claim 1 wherein the ratio of epoxide groups in the acrylic polymer to the carboxyl groups in the vinyl monomer component is within the range of from 1:0.5 to 0.5:1.

* * * * *